Dec. 31, 1940.  H. K. MARTIN  2,227,357

PRODUCTION OF FIBER GLASS

Filed Oct. 21, 1937   2 Sheets-Sheet 1

INVENTOR.
HAROLD K. MARTIN
BY Dorsey, Cole & Garner
ATTORNEYS.

Dec. 31, 1940. H. K. MARTIN 2,227,357
PRODUCTION OF FIBER GLASS
Filed Oct. 21, 1937   2 Sheets—Sheet 2

INVENTOR.
HAROLD K. MARTIN
BY Dorsey, Cole + Garner
ATTORNEYS.

Patented Dec. 31, 1940

2,227,357

UNITED STATES PATENT OFFICE 2,227,357

PRODUCTION OF FIBER GLASS

Harold K. Martin, Beaver Dams, N. Y., assignor, by mesne assignments, to Owens-Corning Fiberglas Corporation, a corporation of Delaware Application October 21, 1937, Serial No. 170,269

5 Claims. (Cl. 49—55)

This invention relates to the manufacture of fine glass filaments, commonly known as glass wool, and more particularly to an apparatus by which such filaments may be economically made in large volume.

At the present time glass wool is made in large quantities with the use of apparatus substantially like that disclosed in the Slayter and Thomas U. S. Patent No. 2,133,236, dated October 11, 1938. Such a structure includes one or more electrically heated feeder bushings positioned in the bottom of the forehearth which heat the glass to a sufficiently high temperature to issue from the bushing in fine streams. These fine streams are blown into minute filaments by a blast of gas issuing under pressure from a blower positioned immediately below the feeder opening. Since these metallic feeder liners are raised to extreme temperatures and are continuously subjected to the action of flowing glass, it has been found necessary to make them of platinum or one of the noble metals, alone or in alloy form. Even these materials will tend to wear and volatilize on those surfaces not in contact with glass with a resultant loss of metal. Thus both the initial cost and the upkeep of this type of apparatus are very considerable.

The object of this invention is an apparatus for the production of glass wool in which the heated feeder bushings are eliminated and the use and loss of noble metals is materially reduced.

The principal feature of novelty of the invention is a comb-like metal body over which molten glass flows from a supply body and on which it divides into a plurality of fine streams. Such a comb may be positioned in a forehearth where it functions both as a feeder and a plunger valve or it may be attached to a flow block and function as a means for breaking up a body of glass into a plurality of individual streams.

Figure 1:
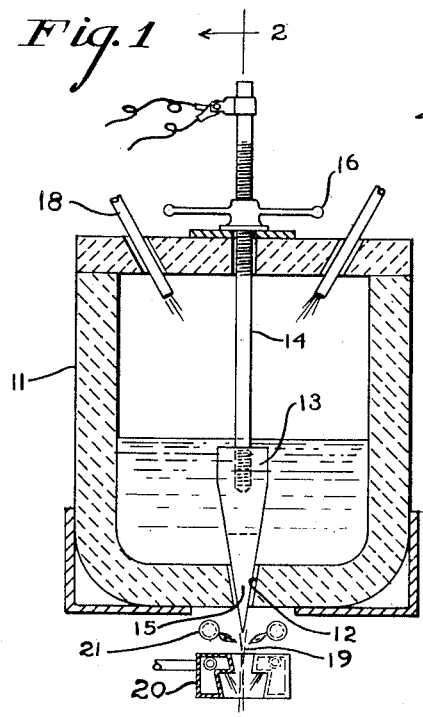
Fig. 1 is a transverse elevation in section of a feeder comb positioned in a forehearth.
Figure 2:
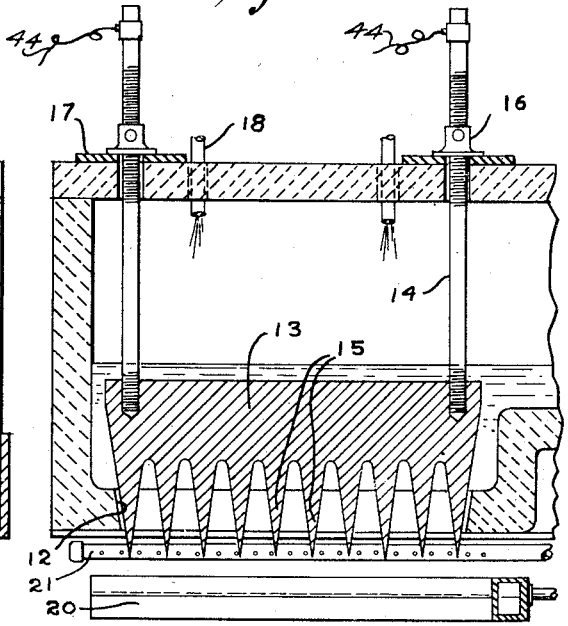
Fig. 2 is a section along line 2—2 of Fig. 1.

Referring to the drawings in more detail, the structure shown in Figs. 1 and 2 includes a forehearth 11 having a narrow slot 12 in the bottom thereof. A comb 13 of nichrome, platinum or other refractory metal, is supported from the roof of the forehearth by rods 14 in such manner that it partially fills slot 12 and the teeth 15 extend thru the floor of the forehearth. The upper ends of rods 14 extend thru the roof of the forehearth and are threaded for engagement with hand wheels 16 which bear against plates 17. Teeth 15 and slot 12 are both tapered in their transverse dimensions so vertical movement of the comb tends to regulate the flow of glass thru the forehearth slot.

The glass in the forehearth may be heated to a highly fluid consistency by burners 18. In this condition the glass will flow thru the slot 12 under the control of the body of the comb 13. As the glass flows between and over teeth 15, surface tension of the glass draws it into individual coatings upon the separate teeth and it flows from the tips thereof in fine streams 19. The diameter of the streams may be controlled by adjustment of the comb vertically and regulation of the fluidity of the glass. The fine streams of glass 19 are directed thru the slot of a blower 20 positioned beneath the forehearth and adjacent to the tips of the comb teeth. Jets of gas issuing at high speed from the blower converge on the streams 19 drawing them out into minute filaments of great length.

While satisfactory results can be obtained with a comb made of any refractory material having sufficient strength, it has been found desirable to make the comb of some refractory metal such as nichrome, platinum, or the platinum alloys and to heat this comb by passing an electric current thru the same. To this end the support rods 14 are formed of electrically conducting material similar to the comb itself and serve as terminals on which a suitably variable electromotive force may be impressed by means of conductors 44 to heat the comb. While the current passing thru the comb is concentrated along the solid back it has been found that considerable heat will be carried down into the teeth by conduction and a desirable control can thus be exercised over the temperature and viscosity of the flowing glass up to the point where it leaves the comb and is drawn down into filamentary form. Since the entire comb is encased with glass, volatilization is reduced to a minimum despite the high temperature to which the comb is heated. As an adjunct to or substitute for electric heating of the comb, gas burners 21 may be positioned so as to play their flames on the tips of the teeth.

Figure 3:
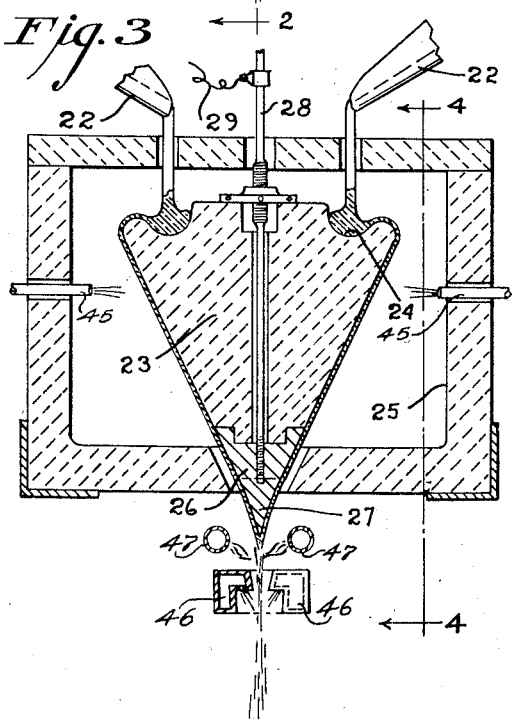
Fig. 3 is a transverse elevation in section of a flow block feeder.
Figure 4:
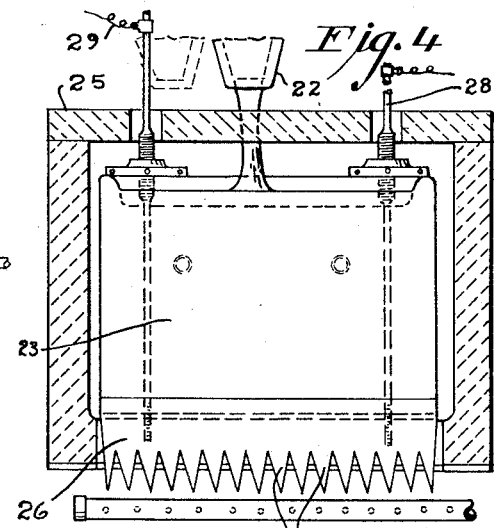
Fig. 4 is a section along line 4—4 of Fig. 3.

In the form of the invention shown in Figs. 3 and 4, the molten glass is conducted by troughs 22 from a tank furnace, not shown, to a refractory flow block 23 where it is deposited in shallow pockets 24. The flow block 23 is enclosed in a muffle chamber 25 provided with burners 45 or other suitable source of heat so that the glass deposited thereon is maintained in a highly fluid condition and flows from pockets 24 down over the surface of the block in a thin layer. The sides of the flow block converge toward the base and terminate in a comb-shaped metal member 26 having separate pointed teeth 27. As the fluid glass flows down onto the tips of this comb, surface tension causes the glass to conform to the surface thereof and it flows from the tips of the teeth as a series of fine streams. Blowers 46 of the same type described in connection with Figs. 1 and 2, are positioned beneath the comb and blow the fine streams of glass into innumerable fine filaments of great length.

Flow block 23 and comb 26 are hung from a support, not shown, by rods 28 which pass thru the refractory block and screw into member 26. Since it is usually desirable to heat the glass upon the comb, rods 28 may be used as conductors to supply an electric current to the comb. Lead wires for this purpose have been shown at 29. As an adjunct to electrical heating of the comb or as a substitute therefor burners 47 may be positioned adjacent the tips of the teeth as in Figs. 1 and 2.

Figure 5:
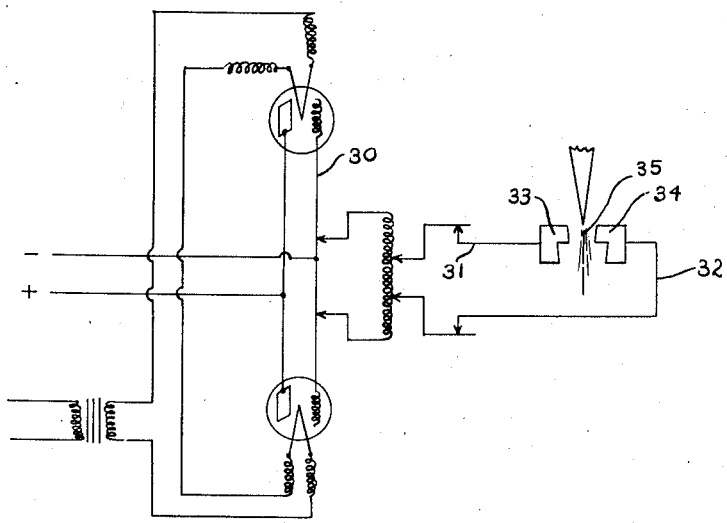
Fig. 5 is a diagrammatic view showing a high frequency oscillator connected to the blowing mechanism.

It has been found that further control of the temperature of the glass as it flows from the tips of the teeth may be obtained by the generation of dielectric losses within the glass itself. This may be accomplished by making the two sides of the blower wholly separate and impressing thereon the output from a high frequency oscillator. Such a structure is shown diagrammatically in Fig. 5. An oscillator of conventional design is shown generally at 30 and is connected by leads 31 and 32 with separate and independent blowers 33 and 34. These blower structures are of steel and constitute the plates of a condenser, the air gap therebetween constituting the dielectric of the condenser. When bodies of glass such as the streams 35 come between these electrodes hysteresis losses within the glass generate heat therein, or, if the air gap breaks down and arcs form between the blowers and the individual streams, heating results by resistance and radiation. In either case the temperature of the streams is controlled to the point at which they are acted on by the gas issuing from the blower.

Figure 6:
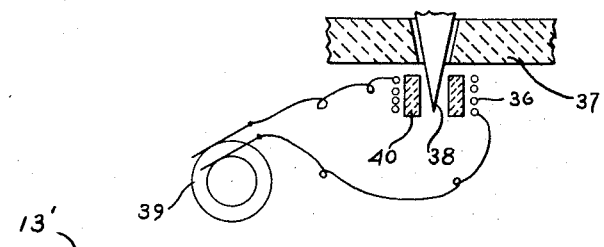
Fig. 6 is a diagrammatic view showing induction heating of the feeder teeth.

Another manner in which electric heating may be applied to this device is illustrated diagrammatically in Fig. 6. In this arrangement an induction coil 36 is placed immediately beneath the floor 37 of the structure surrounding the comb in such a position as to encircle the tips of the teeth 38. An alternator is shown diagrammatically at 39 connected to the induction coil. In this manner suitable alternating current may be caused to flow in the induction coil and eddy currents induced in the teeth 38. A refractory insulating member 40 protects the coil 36 from the heat of the comb and the molten glass thereon.

Figure 7:
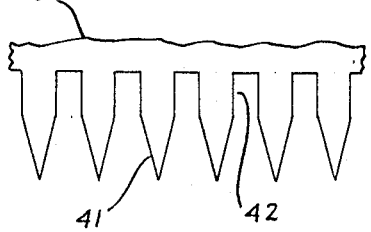
Fig. 7 is an enlarged fragmentary elevation showing the details of tooth structure in one modification of the invention.

It has been found that the ordinary tapered tooth comb construction, such as shown in Fig. 2 is ample, when working with relatively fluid glasses, to permit the glass to completely encircle the teeth and supply an adequate flow of glass. In the case of more viscous glasses, it may be found necessary to increase this space. Such a comb 13' has been shown in Fig. 7. The lower portions of the teeth 41 are tapered in the usual fashion but the space between the teeth is enlarged by the provision of slots 42 of the desired width. These slots may be extended up into the body of the comb a sufficient distance above the floor of the forehearth in which it is to be used to permit such volume of glass to flow as is desired.

While preferred forms of the invention have been shown, modification may be permitted within the scope of the appended claims.

I claim:

1. In a feeder for molten glass, a refractory flow block of generally tapered cross section, a metallic comb shaped member contiguous with the refractory flow block and continuing the tapered contour thereof, support rods passing thru said refractory block and attached to said metallic comb, and means for impressing an electrical potential on said support rods.

2. In a feeder for molten glass, a refractory flow block of generally tapered cross section, a metallic comb shaped member contiguous with said flow block and continuing the tapered contour thereof, means to control the temperature of the flow block and supplemental means for heating the comb shaped member.

3. In a device for forming glass filaments, means for producing a plurality of fine streams of molten glass, blower means positioned on opposite sides of said streams of glass and directing jets of gas under pressure against said streams, said blower means comprising a pair of blower sections electrically independent of one another, and means for impressing a high frequency electric potential on said blower sections.

4. In a feeder for molten glass, a container for molten glass, a flow opening in the bottom of said container, a metal feed member suspended in said container and having pointed projections extending through said flow opening but out of contact with the walls thereof and means for passing an electric current through said metal member.

5. In a feeder for molten glass, a container for the molten glass having at least one flow opening in the floor thereof, a metal feed member suspended in said container but out of contact therewith, said feed member having a series of projections extending downwardly through the opening but out of contact with the wall thereof and forming the roots of a series of individual streams of molten glass, and means for passing an electric current through said feed member.

HAROLD K. MARTIN.